UNITED STATES PATENT OFFICE.

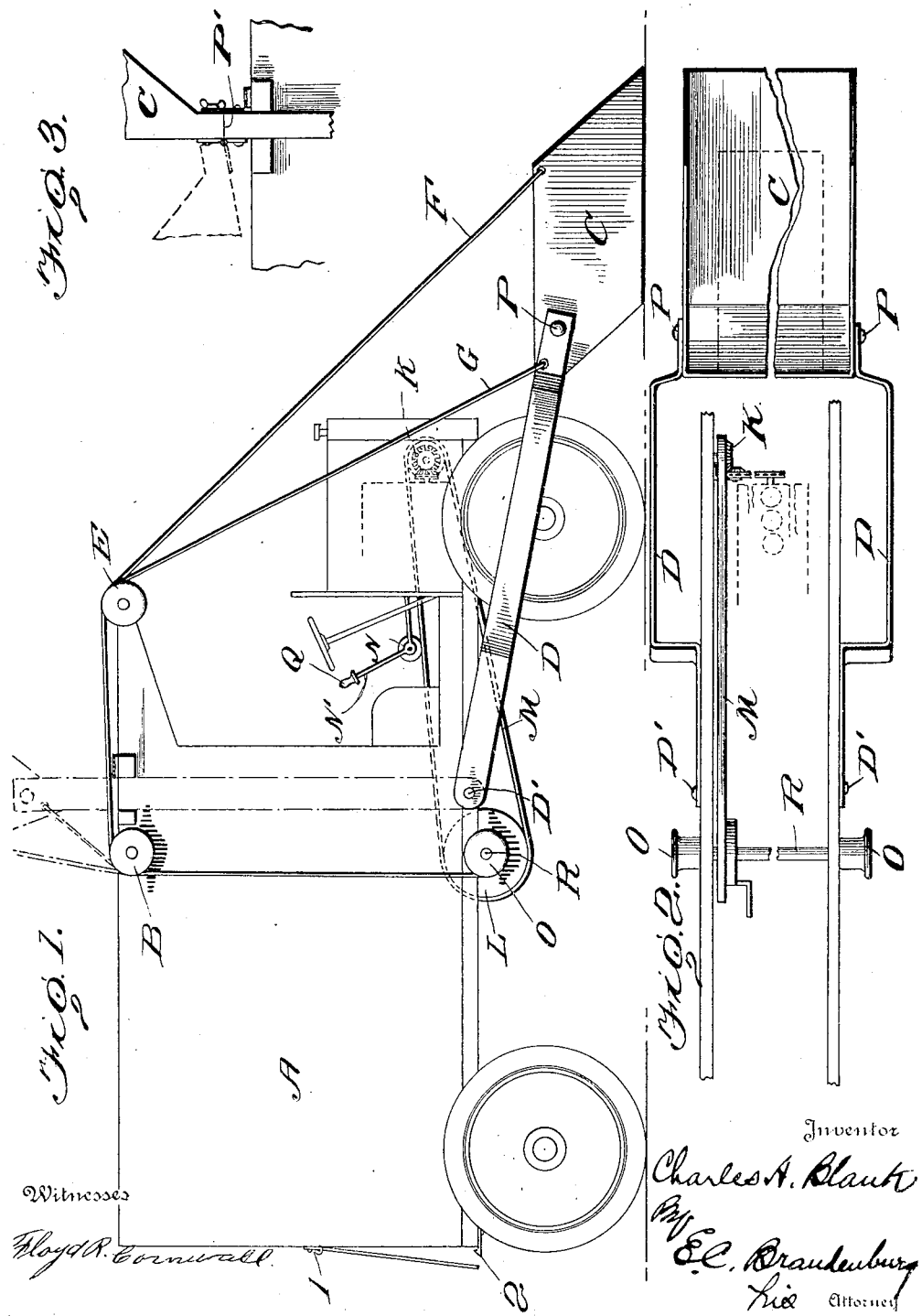

CHARLES A. BLANK, OF MILLER, INDIANA.

SELF-LOADER FOR AUTOTRUCKS.

1,348,777. Specification of Letters Patent. Patented Aug. 3, 1920.

Application filed December 16, 1916. Serial No. 137,425.

*To all whom it may concern:*

Be it known that I, CHARLES A. BLANK, a citizen of the United States, residing at Miller, in the county of Lake and State of Indiana, have invented certain new and useful Improvements in Self-Loaders for Autotrucks, of which the following is a specification.

My invention relates to an improvement in self-loaders for auto trucks, and the object is to provide a truck and scoop or dipper of peculiar construction, the latter pivotally mounted upon the former and constructed and adapted to swing forward of the truck when in operation, and to be forced forward by the power of the truck to become filled, after which the scoop or dipper is raised to an approximately vertical position and dumped into the open top of the truck. In this way I provide a simple means of utilizing the power of an auto truck to scoop and load the material thereinto preparatory to its being conveyed to the dump, means being provided for discharging the load at the rear or other convenient point at the bottom of the truck.

In the acompanying drawings:—

Figure 1 is a side view; and

Fig. 2 is a fragmentary plan view.

Fig. 3 is a detail.

A is an auto truck open at the top for loading, and having a door 1 at the rear, and controlled by a latch 2, through which the contents is discharged. C is a dipper or scoop, preferably of rhomboidal form, as shown in Fig. 1, to facilitate cutting into the matter to be scooped, when the scoop is in a horizontal position, as well as the discharge of its contents when in the raised vertical position as also illustrated in dotted lines in Fig. 1, as indicated in Fig. 3.

The dipper or scoop C may be rigidly secured to the arms D on either side, which are pivoted to the sides of the truck at D', and when the scoop is pivoted to these arms, as at P, it may swing down into the truck when in the raised position.

The scoop or dipper is controlled preferably by either one or two cables F and G running over pulleys E and B to a drive-pulley O, which is keyed to the shaft R, and adapted to be driven by belt M passing over the pulley L, also keyed to the shaft R, and pulley K driven by the automobile engine. This belt M is a flat loose belt.

A belt tightener and brake pulley N is mounted in the L-shaped frame N' pivoted to the truck and provided with a handle Q within reach of the operator. By grasping the handle Q and depressing this L-shaped lever N', the belt M is tightened and motion from the pulley K is in that way transmitted to pulley L, and thence to the shaft R and the pulley O thereon to wind the cable, when it is desired to raise the scoop or dipper.

When it reaches its vertical position, the pressure upon belt M is relaxed, and the contents of the scoop is discharged into the truck. A brake applied to pulley L retards the lowering of the dipper.

It is understood the scoop is lowered and the belt-tightener N is released, and the machine is driven forward until the scoop is filled, when the machine is stopped and the scoop or dipper is raised or dumped, the machine reversed and backed, while the scoop or dipper is again lowered, after which the operation is repeated.

It is obvious that other means of controlling the raising and lowering of the scoop or dipper might be provided, and I have simply described an approved plan for accomplishing the result.

Any operation may be entirely governed by the driver from his seated position.

The dotted lines in Fig. 2 indicate a possible reduced size of dipper or scoop.

From the foregoing, it will be seen that a simple means has been provided for the adaptation of an automoible of standard proportions to the purposes for which this invention is designed by simply applying or pivoting a scoop or dipper thereto, and providing means for placing its position and action within control of the operator.

I claim:

The combination, with a motor car, of arms pivoted to the middle part of the car frame, a shovel secured to the free end portions of the arms and adapted to engage with the ground in front of the car, a winding shaft operatively connected with the driving motor of the car, winding barrels secured on the winding shaft and arranged one on each side of the car frame, front and rear guide sheaves supported above the front and middle portions of the car frame, the rear guide sheaves being arranged to the rear of the pivots of the said arms, and flexible connections wound on the winding barrels and passing over the guide sheaves and operating to raise the shovel so as to discharge its contents at the rear part of the motor car.

In testimony whereof I affix my signature.

CHARLES A. BLANK.